United States Patent [19]
Mead

[11] Patent Number: 5,170,254
[45] Date of Patent: Dec. 8, 1992

[54] INTERMITTENT MOTION FLYING SPOT TELECINE

[75] Inventor: Terence W. Mead, Ware, England

[73] Assignee: Rank Cintel Limited, England

[21] Appl. No.: 655,383

[22] PCT Filed: Aug. 10, 1989

[86] PCT No.: PCT/GB89/00918
§ 371 Date: Feb. 11, 1991
§ 102(e) Date: Feb. 11, 1991

[87] PCT Pub. No.: WO90/01854
PCT Pub. Date: Feb. 22, 1990

[30] Foreign Application Priority Data
Aug. 12, 1988 [GB] United Kingdom ............... 88 19191

[51] Int. Cl.⁵ .................... H04N 3/36; H04N 5/253
[52] U.S. Cl. ................................. 358/214; 358/215; 358/216
[58] Field of Search ............. 358/214, 215, 216, 54

[56] References Cited
U.S. PATENT DOCUMENTS

| | | | |
|---|---|---|---|
| 3,814,850 | 6/1974 | Matchell | 358/215 |
| 3,867,570 | 2/1975 | Blaxtan et al. | 358/215 |
| 4,310,856 | 1/1982 | Poetsch | 358/215 |
| 4,814,885 | 3/1989 | Beard | 358/214 |
| 4,914,520 | 4/1990 | Beard | 358/214 |

FOREIGN PATENT DOCUMENTS

| | | |
|---|---|---|
| 0010433 | 10/1979 | European Pat. Off. |
| 2849172 | 11/1978 | Fed. Rep. of Germany ...... 358/214 |
| 1535563 | 10/1976 | United Kingdom . |
| 2137844 | 3/1983 | United Kingdom . |

OTHER PUBLICATIONS

Collard, Paul, "The Film/Tape Interface*", *Image Technology (Journal of the BKSTS)*, May, 1988, No. 5, (pp. 149–154).

*Primary Examiner*—Michael Razavi
*Assistant Examiner*—Wendy R. Greening
*Attorney, Agent, or Firm*—Ostrolenk, Faber, Gerb & Soffen

[57] ABSTRACT

An intermittent motion flying spot telecine capable of operating in real time provides an adequate film pull down time to allow the use of pin-registration by including a digital scan corrector (18) and a picture store and sequential-to-interlace converter (19) and by adjusting the CRT scanning circuitry (24). Three measures are employed: (I) the film is scanned with a sequential scanning raster and subsequent sequential-to-interlace conversion is performed, so as to combine two field blanking intervals into one longer one, (II) data is written into the picture store at a faster rate than required for the output and read out at a conventional rate, and (III) a triangular line scanning waveform is employed to allow line flyback time to be removed and the instantaneous line rate increased.

10 Claims, 2 Drawing Sheets

5,170,254

INTERMITTENT MOTION FLYING SPOT TELECINE

BACKGROUND OF THE INVENTION

This invention relates to telecines, that is, apparatus designed to provide a video or television signal from cinematographic film.

The earliest telecines were based on the conventional cinematographic projector and had a pull-down mechanism to pull down the film by one frame whereupon the frame was scanned to produce a video signal. However, the output signal has to conform with video scanning standards and this meant that the film movement between scans should be accomplished during the video field blanking interval of typically 1.6 milliseconds. While some such fast pull-down intermittent motion telecines have been produced, in fact this short time period is not sufficient to allow the mechanism to move the film with the desired accuracy.

This problem is overcome in the continuous motion flying-spot telecine which images a cathode ray tube raster onto the film while the film moves steadily past it. Thus part of the vertical scanning action is produced by the motion of the film, and the height of the cathode ray tube raster is reduced. Typically at normal operating speed the raster height may be only about 10% of its normal stationary height. This has several deleterious effects. The image of the phosphor grain particles on the tube face is stretched in the vertical plane, and a similar effect occurs with dust particles in certain parts of the optical system, making the defects they cause more visible. The different raster heights can cause burn patches on the cathode ray tube face which require compensation if the appearance of light and dark bands across the picture is to be avoided. Indeed at certain combinations of film speed and desired scan rate the raster height becomes zero on the tube face, resulting in a worsening of these problems. Dust and phosphor particles appear as vertical lines the full picture height, severe damage is caused to the cathode ray tube phosphor and changes in the light output and colour of the cathode ray tube phosphor can result.

A further difficulty with continuous motion film scanning is the very small steadiness errors caused by scanning the film when it is in motion; these errors become very significant in video editing techniques where it is required to overlay the telecine video with video from another source. It is known that intermittent motion projectors using register pins to locate the film and hold it steady during scanning are capable of producing much improved picture steadiness. However, this is conditional on the speed being reduced so as to allow sufficient film pull-down time.

SUMMARY OF THE INVENTION

We have appreciated that a return to the intermittent motion flying spot telecine could overcome these problems, but intermittent motion telecines were quite rightly less favoured because of their more fundamental inherent problems.

This invention provides various features which can be used, preferably in combination, to enable an intermittent motion flying spot telecine to be constructed which will operate in real time without introducing the defects of the continuous motion telecine noted above, and without suffering from the basic defect of the known intermittent motion machines.

The invention provides ways of generating extra time between frames in which the film can be pulled down to the next frame. Existing commerically-available film projector systems are typified by the Nielson-Hordell 26-00 which is capable of accurate pull down and film registration within 13.9 milliseconds.

A telecine embodying the invention will be described by way of example. This telecine is an intermittent motion flying spot telecine capable of operating at conventional video rates and producing a normally scanned 625/50 or 525/60 interlaced video signal. It employs three significant features.

I. The first feature is that the film is scanned using a sequential line scan which is then converted to a standard interlaced video signal by a sequential-to-interlaced standards converter employing a digital picture store. In this way the two field blanking intervals are combined into one longer frame blanking interval. Sequential scanning is itself known in continuous motion flying spot telecines to avoid having two scan patterns on the screen as is the case with a "jump scan" machine, thus avoiding the concomitant registration problems.

II. A store, preferably the digital picture store just mentioned, receives the video data at a faster data rate than that consistent with normal scanning to reduce the time taken to write a frame to the store and thus lengthen the vertical blanking interval. It is known to lengthen the vertical blanking interval in this way with a continuous motion telecine to permit operation at higher film speeds.

III. The cathode ray tube does not employ a conventional sawtooth line scanning waveform with a fast flyback between lines, but instead uses a triangular or boustrophedral line scanning waveform. In this the raster scans from left to right and then on the next line from right to left. This scanning system avoids the need for a horizontal flyback interval which means the line rate can be effectively increased which further lengthens the vertical blanking interval. In order to restore the signal to its usual form it is then applied to a digital scan corrector which reverses the direction of alternate lines.

BRIEF DESCRIPTION OF THE DRAWINGS

The preferred embodiment of the invention will now be described with reference to the drawings, in which.

DETAILED DESCRIPTION OF THE PREFERRED EMBODIMENT

Figure 1:
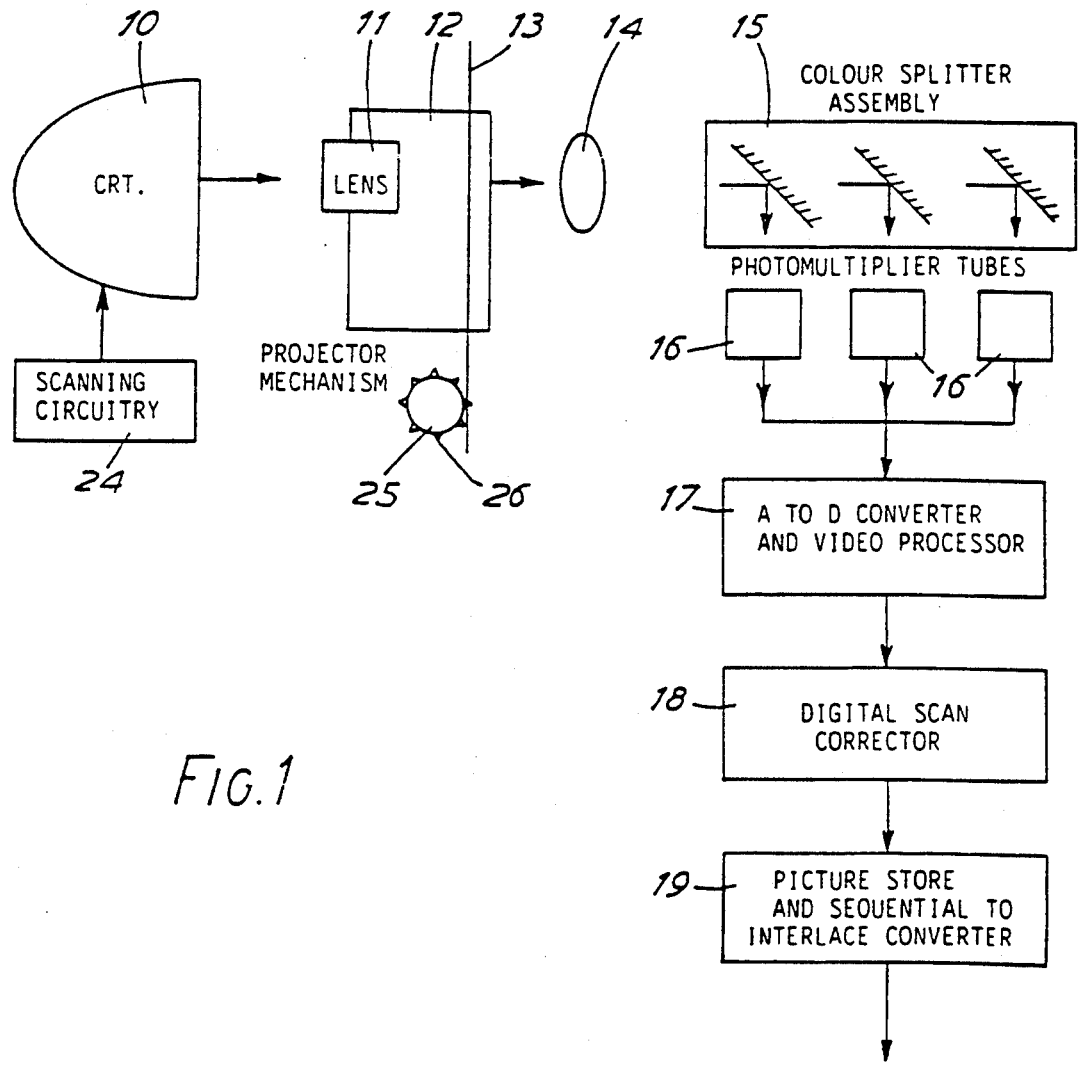
FIG. 1 is a block circuit diagram of the main components of a real time intermittent motion flying spot telecine.

In the system of FIG. 1 a flying spot cathode ray tube 10 having scanning coils is placed adjacent a projector mechanism 12 including an objective lens 11 which accurately images light from the tube 10 onto the film 13. The scanning coils are driven by scanning circuitry 24. The film is intermittently pulled down in its own plane by an intermittent film motion system 25 including pins 26 engaging with the sprocket holes of the film. Light from the tube and transmitted by the film is collected by a condensing lens 14 and separated into its three colour components by a colour splitter assembly 15. Photomultiplier tubes 16 receive the individual colour components and provide video signals in response thereto.

Figure 2:
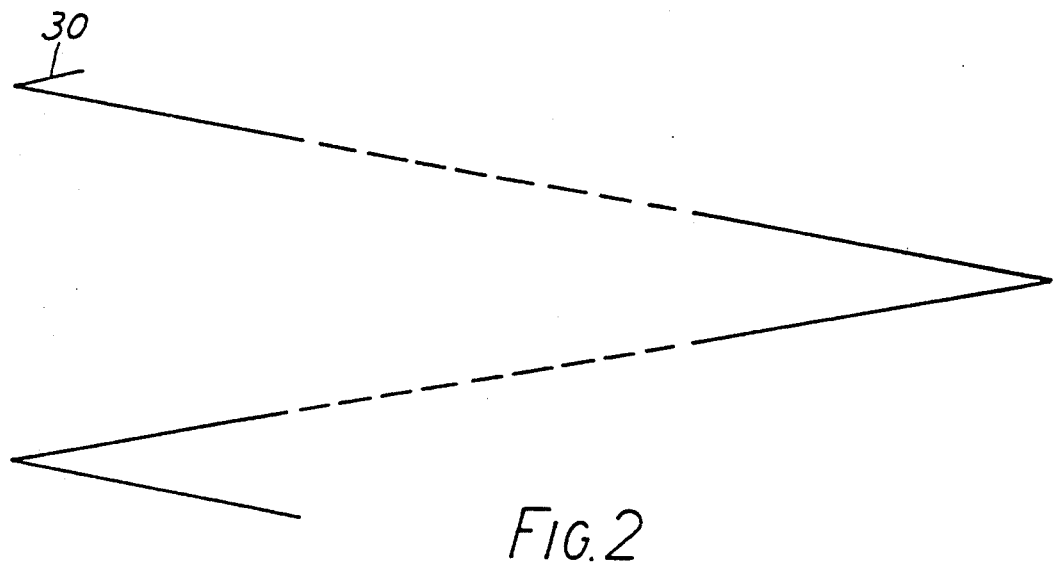
FIG. 2 shows diagrammatically the scan waveform on the tube face.

The scan on the tube face is as shown very diagrammatically at 30 in FIG. 2. The scan alternates in direction on each line, in a manner described in British Patent Specification GB 2,137,844A. The scan is a sequential rather than an interlaced scan.

In a conventional telecine CRT scanner, the natural slope of the lines in a raster scan display is compensated by a similar natural slope in the lines of the telecine scanning raster. In this case the slope in the display raster can be compensated by the addition of an appropriate small amount of the triangular line scan to the vertical scan waveform of the telecine CRT. The vertical scan waveform is otherwise generated from a digital counter and so would maintain a constant vertical position across each line. The additional waveform produces a slop which matches that of the lines in the display raster.

Figure 3:
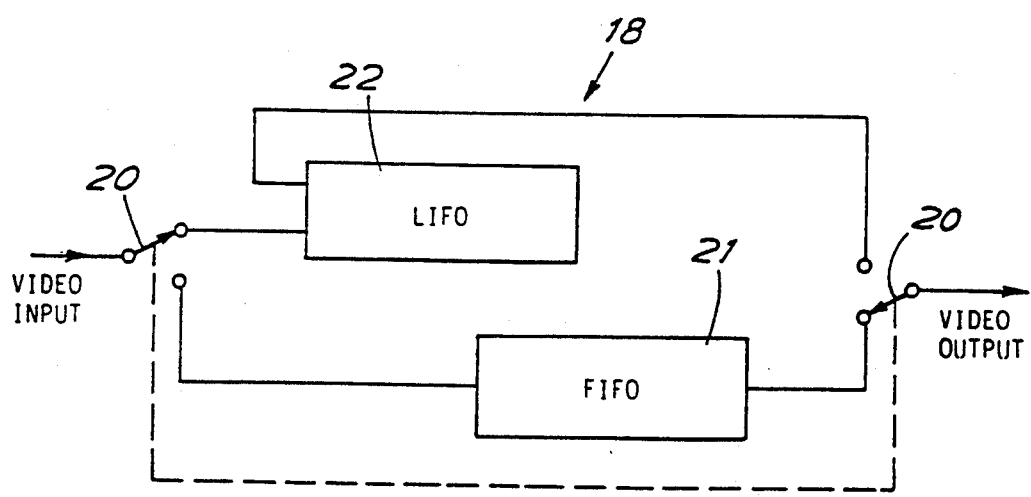
FIG. 3 is a block circuit diagram of the scan corrector of FIG. 1.

The video signals from photomultipliers 16 are in analogue form and are converted to digital form and then subjected to conventional processing in a processor 17. The output of processor 17 is applied to a digital scan corrector 18 which reverses the direction of scan of alternate lines so as to restore the alternating scan to its usual form. The digital scan corrector can take the form shown in FIG. 3. A pair of ganged switches 20 are toggled at the end of each line such that signals from odd lines are routed through a first in first out (FIFO) one-line store 21, and signals from even lines are routed through a last in first out (LIFO) one-line store 22. Samples in the odd lines are thereby left in the same sequence but delayed by one line, whilst samples in the even lines are reversed in sequence and delayed by one line. For this to work. It is important that the line scan on the CRT is strictly linear.

The output of the scan corrector 18 is then applied to a digital picture store 19 which may comprise a Rank Cintel Digiscan for example. The picture store 19 converts the scanning standard in two respects. Firstly, data is written at a data rate which is higher than the rate, dictated by the conventional video standards, at which it is read from the store. Secondly, the picture store performs a sequential-to-interlace conversion. In a modification, the picture store could also perform the function of the scan corrector 18.

Assuming 720 samples per line, data is written to the store 19 at 18.3776 Megasamples per second, and is read from the store at 13.5 Megasamples per second, in the standard interlaced video format according to specifications S.M.P.T.E. RP125 and C.C.I.R. Rec. 656. The time taken to write an active line is 39.178 microseconds, which allowing about 1.6 microseconds for line clamping pulses gives a total line duration of 40.8 microseconds. The write time for a frame using the 525 line system is $40.8 \times 476 = 19.42$ milliseconds. When operating at a film speed of 30 F.P.S. (frames per second), the picture period is 33.33 milliseconds which means that a pull down time of 13.9 milliseconds is achieved. The write time for a frame using the 625 line system is $40.8 \times 576 = 23.5$ milliseconds. When operating at a film speed of 25 F.P.S., the picture period is 40 milliseconds which means that a pull down time of 16.5 milliseconds is provided.

The maximum film speed for the 525 line system in this example is therefore $1000/(13.9+19.42)=30$ frames per second, and for the 625 line system is $1000/(13.9+23.5)=26.7$ frames per second, assuming a pull down time of 13.9 milliseconds actually to be required.

The scanning circuitry 24 is modified so as to provide the desired scan type and scanning rates. It needs to provide for a sequential scan format, an increased line scan rate, and a triangular line scan waveform.

To achieve all this pull down time in one place, at the end of each picture, the line rate is increased to an instantaneous value corresponding to a line length of 40.8 microseconds, namely 24500 lines per second instead of the usual rate of 15750 or 15625 lines per second. This is achieved in part by removing the line flyback time by the triangular scanning technique, and in part by increasing the speed of the scan across the tube face. The pull-down time is further consolidated at the end of each picture rather than each filed by using sequential scanning at the tube and subsequently converting to interlaced scanning.

By providing this generous pull-down time of 13.9 milliseconds a pull down mechanism using pins to accurately engage in the film sprocket holes can successfully be employed.

I claim:

1. An intermittent-motion flying spot telecine capable of operating in real time to scan cinematographic film to provide a video output signal at a video rate, the telecine comprising:
   a cathode ray tube having scanning means for producing a flying spot to scan the cinematographic film;
   an optical system for imaging the spot onto the film to scan film frames of the film;
   an intermittent film motion system for pulling the film through a film plane during times between scans of film frames;
   light detector means for receiving the light passed by the film and producing an electrical signal response thereto at an output; and
   means comprising a digital picture store coupled to the output of the light detector means;
   the scanning means operating and the signal from the light detector means being written into the digitial picture store at a rate which is increased relative to the video rate, and the digital picture store providing the output video signal at the video rate, thereby increasing the times for pulling the film.

2. A telecine according to claim 1, including a sequential-to-interlace converter coupled to the output of the light detector means, and in which the scanning means operates with a sequential scanning raster.

3. A telecine according to claim 1, in which scanning means scans with a triangular of boustrophedral scan and at an instantaneous line rate increased relative to the line rate of the video output signal and including digital storage means coupled to the output of the light detecting means for reversing the samples of alternate lines of the signal and decreasing the line rate to provide the video output signal.

4. A telecine according to claim 2, in which the scanning means scans with a triangular or boustrophedral scan and at an instantaneous line rate increased relative to line rate of the video output signal and including digital storage means coupled to the output of the light detecting means for reversing the samples of alternate lines of the signal and decreasing the line rate to provide the video output signal.

5. Apparatus according to claim 1, including pin means for engaging the film being scanned to locate an image frame to be scanned at a predetermined position relative to the scan.

6. An intermittent-motion flying spot telecine capable of operating in real time to scan cinematographic film to provide a video output signal at a video rate, the telecine comprising:
- a cathode ray tube having scanning means for producing a flying spot to scan the cinematographic film;
- an optical system for imaging the spot onto the film to scan film frames of the film;
- an intermittent film motion system for pulling the film through a film plane during times between scans of film frames;
- light detector means for receiving the light passed by the film and producing an electrical signal responsive thereto at an output, and
- means comprising a sequential-to-interlace converter coupled to the output of the light detector means;
- the scanning means operating with a sequential scanning raster to enable increased times for pulling the film.

7. A telecine according to claim 6, in which the scanning means scans with a triangular or boustrophedral scan and at an instantaneous line rate increased relative to the line rate of the video output signal and including digital storage means coupled to the output of the light detecting means for reversing the samples of alternate lines of the signal and decreasing the line rate to provide the video output signal.

8. Apparatus according to claim 6, including pin means for engaging the film being scanned to locate an image frame to be scanned at a predetermined position relative to the scan.

9. An intermittent-motion flying spot telecine capable of operating in real time to scan cinematographic film to provide a video output signal at a video rate, the telecine comprising:
- a cathode ray tube having scanning means for producing a flying spot to scan the cinematographic film;
- an optical system for imaging the spot onto the film to scan film frames of the film;
- an intermittent film motion system for pulling the film through a film plane during times between scans of film frames;
- light detector means for receiving the light passed by the film and producing an electrical signal response thereto at an output; and
- digital storage means coupled to the output of the light detecting means;
- the scanning means scanning with a triangular or boustrophedral scan and at an instantaneous line rate increased relative to the video rate and the digital storage means being operative to reverse the samples of alternative lines of the output signal of the light detecting means and decrease the line rate to provide the video output signal at the video line rate, thereby increasing the times for pulling the film.

10. Apparatus according to claim 9, including pin means for engaging the film being scanned to locate an image frame to be scanned at a predetermined position relative to the scan.

* * * * *